Figure 5:
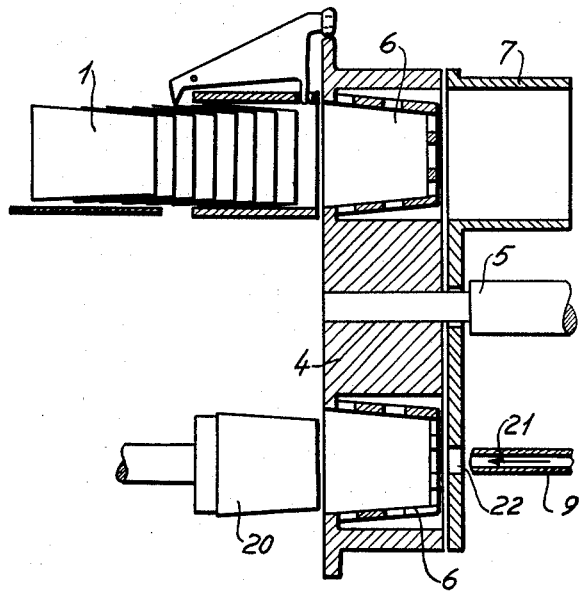

Dec. 1, 1959   O. A. HANSEN   2,914,894
PROCESS AND APPARATUS FOR SEPARATING THE FOREMOST ONE OF
A STACK OF NESTED CUP-SHAPED CAPS FROM THE REMAINDER OF
THE STACK AND CONVEYING IT TO A POSITION
AT A DISTANCE FROM THE STACK
Filed March 19, 1957   4 Sheets-Sheet 1
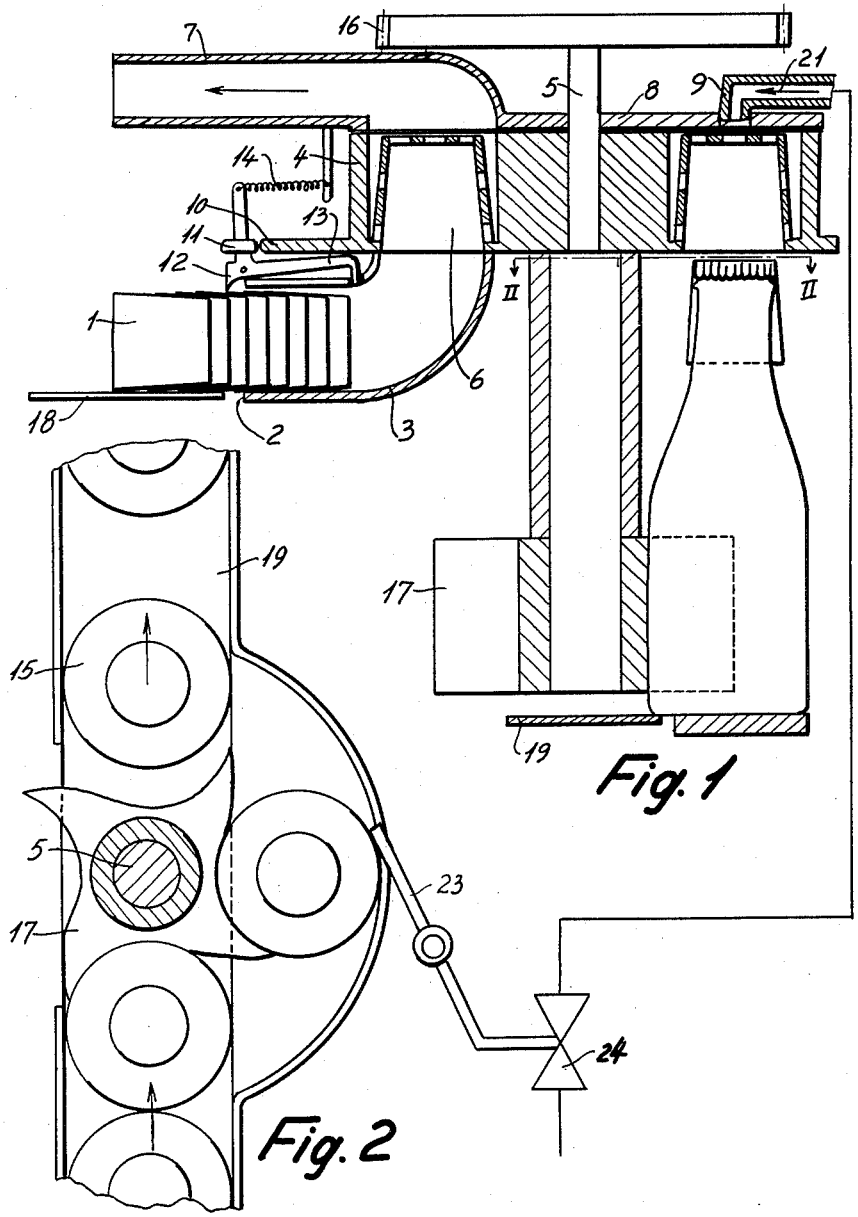
INVENTOR
OSCAR ANTON HANSEN
BY Watson, Cole, Grindle & Watson
ATTORNEYS

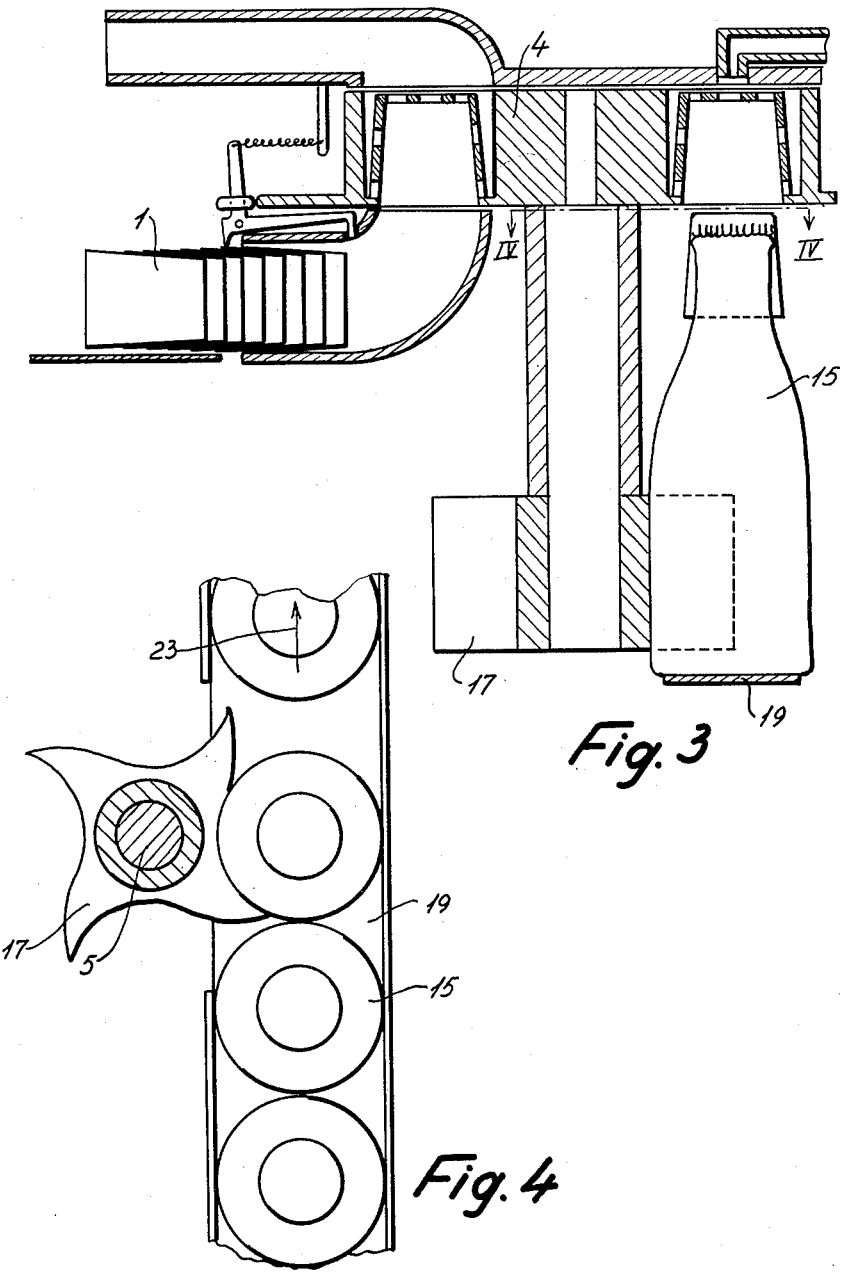

Dec. 1, 1959   O. A. HANSEN   2,914,894
PROCESS AND APPARATUS FOR SEPARATING THE FOREMOST ONE OF
A STACK OF NESTED CUP-SHAPED CAPS FROM THE REMAINDER OF
THE STACK AND CONVEYING IT TO A POSITION
AT A DISTANCE FROM THE STACK
Filed March 19, 1957   4 Sheets-Sheet 3

INVENTOR
OSCAR ANTON HANSEN

BY
Watson, Cole, Grindle & Watson
ATTORNEYS

INVENTOR
OSCAR ANTON HANSEN

United States Patent Office 2,914,894
Patented Dec. 1, 1959

2,914,894

PROCESS AND APPARATUS FOR SEPARATING THE FOREMOST ONE OF A STACK OF NESTED CUP-SHAPED CAPS FROM THE REMAINDER OF THE STACK AND CONVEYING IT TO A POSITION AT A DISTANCE FROM THE STACK

Oscar Anton Hansen, Soborg, Denmark

Application March 19, 1957, Serial No. 647,038

Claims priority, application Denmark March 26, 1956

8 Claims. (Cl. 53—38)

This invention has to do with the handling of cup-shaped conical caps of the type used e.g. as decorative caps for bottles to form a wrapping covering the upper portion of the bottle neck and in most cases also a closure cap or other sealing closure of the bottle. The cup-shaped conical caps, to which the invention relates, are ordinarily made from thin sheet or foil material and are supplied to the position where they are to be used in the form of a stack of such caps closely nested within one another. The problem therefore arises of successively and individually separating the the caps from the stack to make them individually available for their intended purpose, e.g. for application to the necks of already sealed bottles. The invention relates to methods and means for facilitating this operation or, more particularly, for separating the foremost one of a stack of nested cup-shaped conical caps from the remainder of the stack and conveying it to a position at a distance from the stack.

In carrying out this operation it has been proposed, in the case of relatively shallow caps, to remove the caps individually from the stack by means of a suction cup which is applied to the free surface of the cap at the front end of the stack, and then withdrawing the said suction cup, which will cause the cap adhering thereto by suction to be mechanically removed from the stack. This is a relatively complicated procedure and it is not suitable for use with relatively deep cuts made from thin sheet or foil material, because these will invariably be distorted to an extent such as to cause difficulty both during and after the operation here considered.

In the case of caps of the type with which the present invention has to do, another process has therefore been proposed, according to which compressed air is blown into the space between the foremost and the foremost but one of the caps in the stack. This process, however, suffers from several drawbacks. When caps of the type here considered are nested to form a stack, the edges of the caps will be at a relatively small distance from one another, and consequently it is difficult to cause jets of compressed air to impinge correctly and accurately between the edges of the foremost and the foremost but one of the caps respectively. Moreover, the jets of compressed air must be directed very accurately at a predetermined inclination in order to be able to penetrate between the relatively closely contacting walls of the foremost cap and the next following cap respectively. Owing to these critical circumstances there is a great danger that two caps may be separated at a time, or none at all, particularly if the shape of the caps is slightly irregular as may easily occur with caps from thin and soft foil material. Moreover, if slightly distorted caps are separated from the stack, these may give rise to difficulties during subsequent operations in the handling of the caps.

It is an object of the present invention to eliminate the drawbacks referred to. With this in view, according to a principal feature of the invention, there is provided a process for separating the foremost one of a stack of nested cup-shaped conical caps from the remainder of the stack and conveying it to a position at a distance from the stack, comprising the steps of causing said foremost cap to project into an opening of a housing, applying suction to said housing in a position at a distance from said opening, and at the same time detaining the foremost but one of said caps.

Since in carrying out this process, the suction effect will act on the whole of the free area of the foremost cap, a relatively weak suction effect will suffice for separating the said cap from the remainder of the stack, and consequently the handling of the cap will be gentler than when using compressed air as above described. Moreover, all difficulties regarding accurate aiming of the current of air are completely eliminated, and slight distortions of the shape of the cap will not prevent correct operation.

For carrying out the process described, the invention also provides an apparatus comprising a housing having an opening for receiving the front end of the stack of nested caps, means for detaining the foremost but one of said caps while said stack is in position with the foremost one of said caps projecting into said opening, a perforated cap receiving member movable into a cap receiving position with respect to said housing at a distance from said opening, and means for applying suction to the far side of said cap receiving member.

An apparatus constructed in this manner is very simple and reliable in operation, and no valve is needed for stopping the suction air current, because the cap itself when received in said cap receiving member will close the perforations thereof so as to intercept the suction air current at this point. Since the suction effect will cause the wall of the cap to apply itself to the wall of the cap receiving member, the latter may be used for correcting any distortions of the shape of the cap, or even to widen the conical wall of the cap to some extent as may be advantageous with a view to the subsequent handling of the cap, such as the application thereof to a bottle neck.

According to the invention the cap receiving member may be in the form of a perforated cup or basket, which may be mounted in a compartment of a rotatable slide arranged to rotate synchronously with a bottle mill for bottles to which the caps are to be individually applied. In this manner, the cap receiving member is thus additionally used for conveying the cap to the bottling position.

According to a further feature of the invention, the opening into which the front end of the stack of caps is introduced is disposed in a substantially vertical plane. Owing to this arrangement, the stack may be introduced in horizontal position, which again permits the use of long stacks without any danger of deformation owing to the force of gravity.

The invention will now be described in further detail with reference to the accompanying drawings, in which Fig. 1 shows a vertical section through one form of an apparatus for carrying out the process according to the invention, Fig. 2 a section along the line II—II of Figure 1, Fig. 3 a vertical section through a slightly modified form of an apparatus according to the invention, Fig. 4 a section along the line IV—IV of Figure 3, Fig. 5 a vertical section through an apparatus according to a third embodiment of the invention, Fig. 6 a vertical section through an apparatus according to a fourth embodiment of the invention, and Fig. 7 a section along the line VII—VII of Figure 6.

In the drawing, 1 is a stack of caps which is introduced into an opening 2 of a housing 3, which can be closed by means of a slide 4 mounted for rotation in a horizontal plane by means of a shaft 5 which is driven from a motor, not shown, by way of a gear wheel 16. The slide 4 comprises a plurality of bores or compartments each containing a cap receiving member in the form of a perforated cup or basket 6. When one of the cups 6 is in a position registering with an upper opening of the housing 3, the latter is thereby connected with a suction pipe 7, which is connected to the suction side of a vacuum pump, not shown. During its rotating movement, the slide 4 slides along an upper seat 8 which is constructed with openings connecting with the suction pipe 7 and with a venting or blow pipe 9 respectively.

The bottom side of the slide 4 is constructed with a cam 10, which during the movement of the slide controls a leverage comprising a roller 11 rotatably mounted on a two armed lever 12, 13, which is pivotably mounted adjacent the opening 2 of the housing 3. The roller 11 is kept in engagement with the cam 10 by means of a spring 14.

The shaft 5 is connected with a feeding device for bottles 15, e.g. in the form of a mill 17, and the shaft 5 and the mill are synchronized so that the bottles 15 follow the cup 6 during part of their movement.

The apparatus shown in the drawing operates as follows: When a cup 6 is moved to a position above the housing 3 as a consequence of the rotation of the shaft 5, the cam 10 will press the roller 11 to the left in the drawing, whereby one arm 12 of the lever will be urged downwards in a manner known per se to detain the foremost but one of the caps in the stack. At the same time, the arm 13 releases the foremost cap in the stack. When the foremost cap but one has thus been detained, the cup 6 is moved to a position above the housing 3 and the interior of the latter is thereby put in communication with the suction pipe 7 and through the latter with the suction side of the pump by way of the perforations of the cup 6 so that the side of the foremost cap facing away from the other caps will be subjected to a vacuum under the influence of which the cap will be separated from the remainder of the stack. When the cap has been thus separated, the air current produced by the pump will move the cap up into the cup 6, whereby the holes of the latter will be covered so that the suction effect within the housing 3 ceases. During the further rotation of the slide the cap will be moved towards the position of the venting or blow tube 9 and during this part of the movement the cap will be held in position in the cup as a consequence of the vacuum existing between the upper side of the cup and the slide seat 8. When the cup arrives above the bottle 15 and follows the movement of the latter, the space between the seat 8 and the upper side of the cup 6 is vented through the pipe 9. For this purpose the pipe 9 may e.g. be provided with a valve 24, which is operated by means of a spring biased arm 23 so that the valve is opened when a bottle passes the mill 17 and is again closed when the bottle leaves the latter. As a consequence of the venting which may be supplemented by the supply of compressed air from the pressure side of the said pump, the cap is released from the cup and falls down on the neck of the bottle 15.

The cam 10 has a shape such that when the cup 6 is moved away from the housing 3, the lever 12, 13 is rotated clockwise in the drawing, whereby the bent end of the lever 13 is moved downwards to form an abutment, against which the stack is then urged by the suction air current. On further rotation of the cam 10, the lever 12, 13 is returned to the position shown in the drawing, where the apparatus is ready for the liberation of another cap.

It will be seen that apart from the provision of the valve 24 in the tube 9, if desired, no means are required for controlling the flow of air, because this is automatically intercepted as soon as the separated cap arrives in the cup 6. When the cap enters into the cup, it will at the same time assume the inner shape of the cup, so that any distortion of the shape of the cap will be corrected, or the conical wall of the cap may be widened if desired.

If no bottle is present below the cup, when the latter, with the cap seated therein, arrives at the position of the venting tube 9—which may very well occur, if the feeding of bottles is temporarily interrupted—the cap will not be released, but the only consequence of this is that when the cup with the cap still seated therein arrives again in position above the housing 3, no new cap is separated from the stack because the communication between the housing 3 and the vacuum source is intercepted by the cap in the cup. Since the stack of caps is horizontally disposed, no unintentional feeding movement of the stack will take place at the moment when the stack has been released by the arm 12 and the arm 13 has not yet reached its stopping position. Such unintentional feeding might very well occur in known apparatuses, in which the stack of caps is fed forward under the influence of its gravity.

In the drawing, there is illustrated a support 18 on which the stack of caps 1 rests. Since the centering of the stack of caps need not be very accurate in the apparatus here considered, as contrasted to the previously known apparatuses, it will be understood that the position and form of the support 18 are of minor importance.

As will appear from the drawing, a liberated cap will always move in the same direction as the current of air produced by the vacuum source, so that no irregularities will occur owing to turbulence during the transfer of the liberated cap from the stack to one of the cups 6.

As illustrated in Figure 3, the apparatus, instead of being driven by means of the gear wheel 16, may be driven by means of the bottles 15, which are fed forward by means of a conveyor 19. When the bottles 15 are moved by the conveyor in the direction of the arrow 21 in Figure 4, they will impart a rotating motion to the mill 17 while passing the same, and since the mill is drivably connected with the slide 4, the latter will be rotated to cause a cap to be separated from the stack 1.

The apparatus illustrated in Figure 5 is intended for separating the conical cap from the stack 1 in such a manner that the liberated caps can be transferred to a mandrel 20. In this case, the shaft 5 driving the slide 4 is horizontally disposed so that the caps are transferred from the stack 1 to the mandrel 20 in horizontal position. In the apparatus illustrated in Figure 5, a cap is separated from the stack 1 and transferred to a cup 6 in the same manner as described above. When the cup has been moved to the lower position illustrated in Figure 5, where the cap in the cup registers with the mandrel 20, compressed air, which may e.g. be taken from the pressure side of the vacuum pump, is admitted through the venting tube as marked by the arrow 21. Thereby the cap will be released from the cup 6 and transferred to the mandrel 20. Alternatively, a push rod may be used for this purpose which rod will be pushed through a hole 22 in the slide 8 and through one of the perforations of the cup 6, so that the cap is pushed from the cup 6 onto the mandrel 20, which may then be used for transferring the cap e.g. to a printing machine serving to print a trademark or an advertising or other inscription on the cap.

Figure 6:
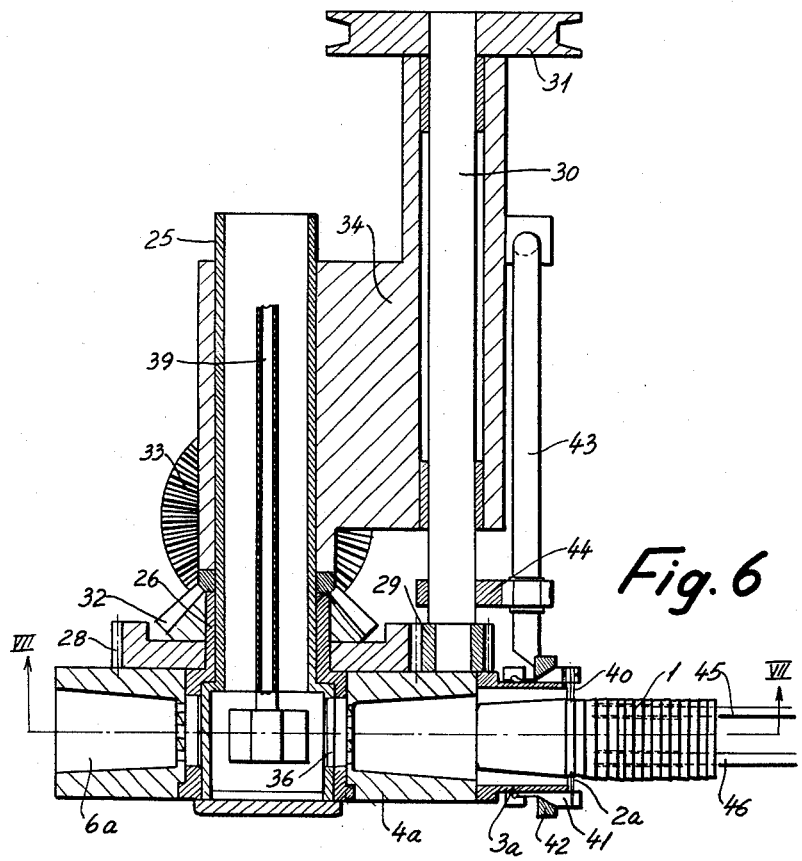
Figure 7:
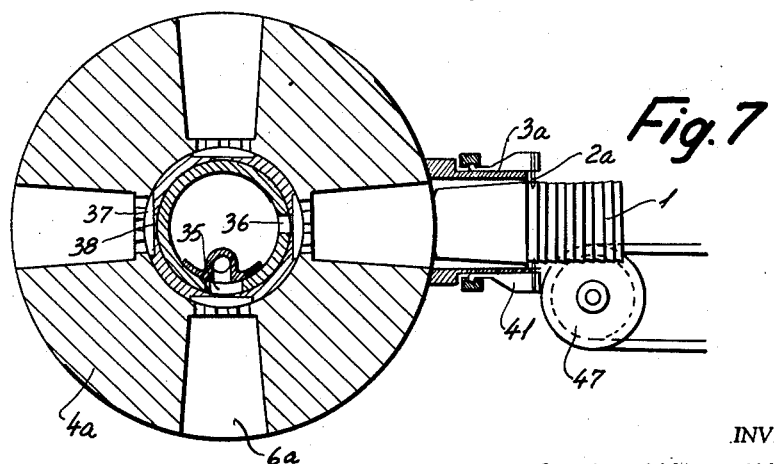

In the embodiment illustrated in Figures 6 and 7, the cups 6a are constituted by radially disposed, conical bores in the slide 4a which is rotatably mounted on the end of a suction pipe 25 with interposition of a sleeve 26 attached to the slide 4a. In this embodiment the slide is driven by means of a gear wheel 28 which is rigidly connected with the slide and engages with a gear wheel 29 attached to the end of a shaft 30, the other end of which carries a pulley 31 drivably connected with a motor, not shown. A bevel gear 32 is attached to the sleeve 26 and engages with another bevel gear 33 which drives a bottle mill similar to the mill 17 illustrated in Figure 3.

In the pipe 25 which is mounted in the frame 34 of the apparatus, two slots 35 and 36 are provided through which the interior of the pipe 25 communicates with a cup when the latter registers with the end of the stack of caps 1. In this instance only the bottom of the cup is perforated, and in a position opposite each cup the sleeve 26 is constructed with a recess 37, Figure 7, in the middle of which a hole 38 is provided which communicates with the slots 36 and 35 during the rotation of the slide 4a. Interiorly of the pipe 25 another pipe 39 is mounted which communicates with a source of compressed air, not shown, and this latter pipe is in permanent communication with the slot 35.

During the release of the foremost cap, the next following cap is detained by means of pins 40 which are attached to resilient arms 41 around which a ring 42 is provided, the inner surface of which is of conical shape and which is moved by means of a pivoted arm 43 which is kept in engagement with a cam 44 on the shaft 30.

In this embodiment, the stack of caps is introduced into the housing 3a by means of two belt conveyors 45 and 46 running on rollers 47. No stop similar to the stop 13 in Figure 1 is required because the foremost cap in the stack will rest against the circumference of the slide 4a when the latter is moved.

I claim:

1. An apparatus for separating the foremost one of a stack of nested cup-shaped conical caps from the remainder of the stack and conveying it to a position at a distance from the stack, comprising a housing having a cap entrance opening for receiving the front end of the stack and nested caps, means for detaining the foremost but one of said caps while said stack is in position with the foremost one of said caps projecting into said entrance opening, a perforated cap receiving member movable into a cap receiving position with respect to said housing at a distance from said opening, and means for applying suction to said housing at the far side of said cap receiving member.

2. An apparatus as in claim 1 in which said cap receiving member is in the form of a perforated cup or basket.

3. An apparatus as in claim 1 in which the said opening of said housing is disposed in a substantially vertical plane.

4. An apparatus as in claim 2 in which said cup or basket is mounted in a compartment of a rotatable slide arranged to rotate synchronously with a bottle mill for bottles to which the caps are to be individually applied.

5. An apparatus as in claim 1, in which said cap receiving member is constituted by a radially disposed bore in a slide mounted for rotation about a horizontal axis, said housing being radially disposed with respect to the axis of rotation of said slide and engaging the cylindrical surface thereof.

6. A process for separating the foremost one of a stack of nested cup-shaped conical caps from the remainder of the stack and conveying it to a position at a distance from the stack, comprising the steps of causing said foremost cap to project into an opening of a housing, applying suction to said housing through the perforated wall of a cap receiving member shaped in accordance with the intended shape of the caps in a position at a distance from said opening, and at the same time detaining the foremost but one of said caps.

7. An apparatus for separating the foremost one of a stack of nested cup-shaped conical caps from the remainder of the stack and conveying it to a position at a distance from the stack, comprising a compartment having a cap entrance opening for receiving the front end of the stack of nested caps and an exit opening at a distance from said entrance opening, means for detaining the foremost but one of said caps while said stack is in position with the foremost one of said caps projecting into said entrance opening, a cap receiving member shaped in accordance with the intended shape of the caps to be handled by the apparatus and having a perforated end wall and a perforated conical wall terminating in a cap receiving opening, said cap receiving member being movable into a cap receiving position outside said housing with its cap receiving opening connecting with the exit opening of said housing, and means for applying suction to said housing through the perforated wall of said cap receiving member.

8. An apparatus for separating the foremost one of a stack of nested cup-shaped conical caps from the remainder of the stack and conveying it to a position at a distance from the stack, comprising a housing having an opening for receiving the front end of the stack of nested caps, means for detaining the foremost but one of said caps while said stack is in position with the foremost one of said caps projecting into said opening, a perforated cap receiving member movable into a cap receiving position with respect to said housing at a distance from said opening, said cap receiving member being in the form of a perforated cup mounted in a compartment of a rotatable slide arranged to rotate synchronously with a bottle mill for bottles to which the caps are to be individually applied, and means for applying suction to the far side of said cap receiving member, said bottle mill and said slide being arranged to be driven by the bottles as the latter are fed forward by means of a conveyor.

References Cited in the file of this patent

UNITED STATES PATENTS

| 1,238,895 | Dempsey | Sept. 4, 1917 |
| 2,551,476 | Vantlander | May 1, 1951 |
| 2,600,138 | Tesch | June 10, 1952 |

FOREIGN PATENTS

| 750,824 | Great Britain | June 20, 1956 |
| 1,044,756 | France | Nov. 20, 1953 |